United States Patent
Zhou

(10) Patent No.: US 10,432,577 B2
(45) Date of Patent: Oct. 1, 2019

(54) METHOD AND DEVICE FOR REDIRECTION TO WEB PAGE

(71) Applicant: ZTE Corporation, Shenzhen (CN)

(72) Inventor: Shuyang Zhou, Shenzhen (CN)

(73) Assignee: XI'AN Zhongxing New Software Co., LTD., Shaanzi (CN)

( * ) Notice: Subject to any disclaimer, the term of this patent is extended or adjusted under 35 U.S.C. 154(b) by 118 days.

(21) Appl. No.: 15/521,390

(22) PCT Filed: May 15, 2015

(86) PCT No.: PCT/CN2015/079117
§ 371 (c)(1),
(2) Date: Apr. 24, 2017

(87) PCT Pub. No.: WO2016/062077
PCT Pub. Date: Apr. 28, 2016

(65) Prior Publication Data
US 2017/0317967 A1    Nov. 2, 2017

(30) Foreign Application Priority Data
Oct. 24, 2014  (CN) .......................... 2014 1 0583728

(51) Int. Cl.
*H04L 29/12* (2006.01)
*H04L 29/06* (2006.01)
*H04L 29/08* (2006.01)

(52) U.S. Cl.
CPC .......... *H04L 61/1511* (2013.01); *H04L 29/12* (2013.01); *H04L 61/2038* (2013.01);
(Continued)

(58) Field of Classification Search
None
See application file for complete search history.

(56) References Cited

U.S. PATENT DOCUMENTS

2003/0225900 A1* 12/2003 Morishige ......... H04L 29/12358
709/230
2010/0198916 A1* 8/2010 Leighton ............. G06F 17/3089
709/203
(Continued)

FOREIGN PATENT DOCUMENTS

CN    102006675 A    4/2011
CN    102752411 A    10/2012
(Continued)

OTHER PUBLICATIONS

International Search Report for corresponding application PCT/CN2015/079117 filed on May 15, 2015; dated Jul. 29, 2015.
(Continued)

*Primary Examiner* — Krista M Zele
*Assistant Examiner* — Mohammad Yousuf A. Mian
(74) *Attorney, Agent, or Firm* — Cantor Colburn LLP

(57) ABSTRACT

Disclosed are a method and device for redirection to a Web page. The method includes: when a first device receives a Domain Name System (DNS) request from a second device and a domain name requested by the DNS request is not a domain name of a gateway of the first device and satisfies a redirection condition, the first device sends a response message of the DNS request to the second device (S102), wherein an unused virtual Internet Protocol (IP) address in a locally preset virtual IP address group is carried in the response message; the first device establishes a correspondence between the virtual IP address and the domain name satisfying the redirection condition (S104); and after receiving a Transport Control Protocol (TCP) data packet sent from the second device, the first device replaces the virtual IP address carried in the TCP data packet with a designated IP address, and forwards, according to the designated IP address, interactive data packets between the second device and the designated IP address (S106). The technical solution
(Continued)

solves the problem in the related art of redirection to the Web page resulting from optimization of a Personal Computer (PC) browser.

10 Claims, 4 Drawing Sheets

(52) U.S. Cl.
CPC ...... *H04L 61/2061* (2013.01); *H04L 61/2514* (2013.01); *H04L 67/02* (2013.01); *H04L 67/2814* (2013.01); *H04L 61/2007* (2013.01); *H04L 69/16* (2013.01)

(56) References Cited

U.S. PATENT DOCUMENTS

2013/0318143 A1   11/2013  Li
2014/0089661 A1    3/2014  Mahadik
2014/0301191 A1*  10/2014  Ludwig ................... H04L 45/72
                                                                  370/230

FOREIGN PATENT DOCUMENTS

CN        104079534 A    10/2014
EP          2579539 A1     4/2013
EP          2787693 A1    10/2014

OTHER PUBLICATIONS

European Search Report for corresponding application EP15852824; Report dated Sep. 22, 2017.

* cited by examiner

METHOD AND DEVICE FOR REDIRECTION TO WEB PAGE

TECHNICAL FIELD

The present disclosure relates to the field of communications, and more particularly to a method and device for redirection to a Web page.

BACKGROUND

With the rapid development of 3G, 4G and radio communication technologies, more and more people surf the Internet by using mobile terminals such as data cards and MIFI.

A page for setting is needed for a device such as a data card and MIFI usually, and is presented to a user in a form of a Web page (the Web page is hereinafter referred to as web_ui) usually, web_ui has a local domain name and a local area network Internet Protocol (IP) address (gateway address of terminal). When the device is connected to a Personal Computer (PC), the user may open web_ui of the device by inputting the local domain name or gateway IP address into a PC browser, and may perform relevant operation and setting on the device.

Generally speaking, the user will not open web_ui. Under some conditions, when the user opens a web page by using the browser, a terminal needs to actively assist the user in redirection to a Web page of a gateway to give relevant prompts, thus improving the user experience. If the device is not networked, the user cannot browse a web page via the device, it is necessary to redirect to web_ui, and the user is prompted to operate the device to be networked. After online upgrade is completed, it is necessary to redirect to web_ui, and the user is prompted of a scenario such as an upgrade result.

At current, mainly two solutions for redirecting a device to web_ui are used.

Solution 1: A Domain Name System (DNS) request data packet sent from a PC is captured, and when a redirection condition is satisfied, a DNS response packet of which a domain name resolution result is a gateway address is assembled and returned to the PC.

Solution 2: A tcp data packet sent from a PC is captured, when a redirection condition is satisfied, a tcp message is routed to a Web server of a gateway, and when browser tcp handshaking is completed and an http request is successfully sent out, a response packet of which http 302 is redirected to a web_ui domain name is assembled and returned to the PC, thus achieving the aim of redirecting to web_ui. In the solution, when the device is not networked, a DNS module is also needed to return a fixed virtual IP address response, such that a PC browser completes DNS resolution, and smoothly sends out a tcp handshaking message.

Both the solutions have the defects of user experience resulting from optimization of the PC browser: when accessing a domain name and conducting DNS resolution successfully, in order to improve the web page access efficiency, the PC browser will save a correspondence between the domain name and an IP address obtained by DNS resolution in browser caching for a period of time. When the caching is effective and the domain name is re-accessed in the same label page, DNS resolution is jumped, and access is conducted by directly using the saved IP address. As for solution 1, when the redirection condition is satisfied, a DNS response for the gateway address is given to the PC for redirection, the PC browser saves this DNS resolution result, and if the device does not need to be redirected within the period of effective time for browser caching and the user continues accessing the domain name in the same label page of the browser, the browser jumps a DNS resolution stage, accesses by directly using the gateway address, and redirects to web_ui again until the caching fails or the user re-opens a label page. Similarly, as for solution 2, a redirected domain name when the device is not networked also has this defect.

Any effective solution has not been proposed yet currently for the problem in the related art where a redirected domain name will be redirected within a period of time in case of not wiping a cache from a PC browser when being not required to be redirected due to optimization of the PC browser.

SUMMARY

Embodiments of the present disclosure provide a method and device for redirection to a Web page, which are intended to at least solve the problem in the related art where a redirected domain name will be redirected within a period of time in case of not wiping a cache from a PC browser when being not required to be redirected due to optimization of the PC browser.

According to an embodiment of the present disclosure, a method for redirection to a Web page is provided, which may include: when a first device receives a DNS request from a second device and a domain name requested by the DNS request is not a domain name of a gateway of the first device and satisfies a redirection condition, the first device sends a response message of the DNS request to the second device, the response message carrying an unused virtual IP address in a locally preset virtual IP address group, the unused virtual IP address being a virtual IP address having not been used for redirecting a DNS response packet yet; the first device establishes a correspondence between the virtual IP address and the domain name satisfying the redirection condition; and after receiving a TCP data packet sent from the second device, the first device replaces the virtual IP address carried in the TCP data packet with a designated IP address, and forwards, according to the designated IP address, interactive data packets between the second device and the designated IP address.

The step of replacing, when the redirection condition is satisfied, the virtual IP address carried in the TCP data packet according to the designated IP address to further implement the interactive data packets of data via the designated IP address may include: replacing the designated IP address with a gateway address of the first device, and forwarding interactive data packets between the second device and the gateway according to the gateway address.

The step of replacing, when the redirection condition is not satisfied, the virtual IP address carried in the TCP data packet according to the designated IP address to further implement the interactive data packets of data via the designated IP address may include: acquiring, by the first device, a destination address of the TCP data packet from the TCP data packet; judging, by the first device, whether a virtual IP address corresponding to the destination address exists in the virtual IP address group; if so, searching for a redirected domain name corresponding to the virtual IP address; and replacing the virtual IP address with a true IP address of the redirected domain name, and forwarding interactive data packets between the second device and the true IP address according to the true IP address of the redirected domain name.

In certain embodiments, after forwarding the interactive data packets between the second device and the true IP address according to the true IP address of the redirected domain name, the method may further include: conducting DNS resolution on the redirected domain name, so as to obtain a true IP address of the redirected domain name.

In certain embodiments, after forwarding the interactive data packets between the second device and the true IP address according to the true IP address of the redirected domain name, the method may further include: saving a correspondence between the redirected domain name and the true IP address of the redirected domain name.

According to another embodiment of the present disclosure, a device for redirection to a Web page is provided, which may include: a receiving module, configured to send, when a DNS request is received from a second device and a domain name requested by the DNS request is not a domain name of a gateway of the first device and satisfies a redirection condition, a response message of the DNS request to the second device, the response message carrying an unused virtual IP address in a locally preset virtual IP address group, the unused virtual IP address being a virtual IP address having not been used for redirecting a DNS response packet yet; an establishment module, configured to establish a correspondence between the virtual IP address and the domain name satisfying the redirection condition; and a replacement module, configured to replace, after receiving a TCP data packet sent from the second device, the virtual IP address carried in the TCP data packet with a designated IP address, and forward, according to the designated IP address, interactive data packets between the second device and the designated IP address.

The replacement module may include: a first replacement unit, configured to replace, when the redirection condition is satisfied, the designated IP address with a gateway address of the first device, and forward interactive data packets between the second device and the gateway according to the gateway address.

When the redirection condition is not satisfied, the replacement module may further include: an acquisition unit, configured to acquire a destination address of the TCP data packet from the TCP data packet; a judgment unit, configured to judge whether a virtual IP address corresponding to the destination address exists in the virtual IP address group; and a second replacement unit, configured to search, if so, for a redirected domain name corresponding to the virtual IP address, replace the virtual IP address with a true IP address of the redirected domain name, and forward interactive data packets between the second device and the true IP address according to the true IP address of the redirected domain name.

The device may further include: a resolution module, configured to conduct DNS resolution on the redirected domain name, so as to obtain a true IP address of the redirected domain name.

The device may further include: a saving module, configured to save a correspondence between the redirected domain name and the true IP address of the redirected domain name.

By means of the embodiments of the present disclosure, when a first device receives a DNS request from a second device and a domain name requested by the DNS request is not a domain name of a gateway of the first device and satisfies a redirection condition, the first device sends a response message of the DNS request to the second device, the response message carrying an unused virtual IP address in a locally preset virtual IP address group, the unused virtual IP address being a virtual IP address having not been used for redirecting a DNS response packet yet; the first device establishes a correspondence between the virtual IP address and the domain name satisfying the redirection condition; and after receiving a TCP data packet sent from the second device, the first device replaces the virtual IP address carried in the TCP data packet with a designated IP address, and forwards, according to the designated IP address, interactive data packets between the second device and the designated IP address. The problem in the related art where a redirected domain name will be redirected within a period of time in case of not wiping the cache from a PC browser when being not required to be redirected due to optimization of the PC browser is solved, thus the user experience is improved.

BRIEF DESCRIPTION OF THE DRAWINGS

The drawings illustrated herein are intended to provide a further understanding for the present disclosure, and form a part of the present application. The schematic embodiments and illustrations of the present disclosure are intended to explain the present disclosure.

DETAILED DESCRIPTION OF THE EMBODIMENTS

It is important to note that the embodiments in the present application and characteristics in the embodiments may be combined under the condition of no conflicts. The present disclosure will be illustrated hereinbelow with reference to the drawings and in conjunction with the embodiments in detail.

The steps shown in the flowchart of the drawings may be executed in a computer system including, for example, a set of computer-executable instructions. Moreover, although a logic sequence is shown in the flowchart, the shown or described steps may be executed in a sequence different from the sequence here under certain conditions.

Figure 1:
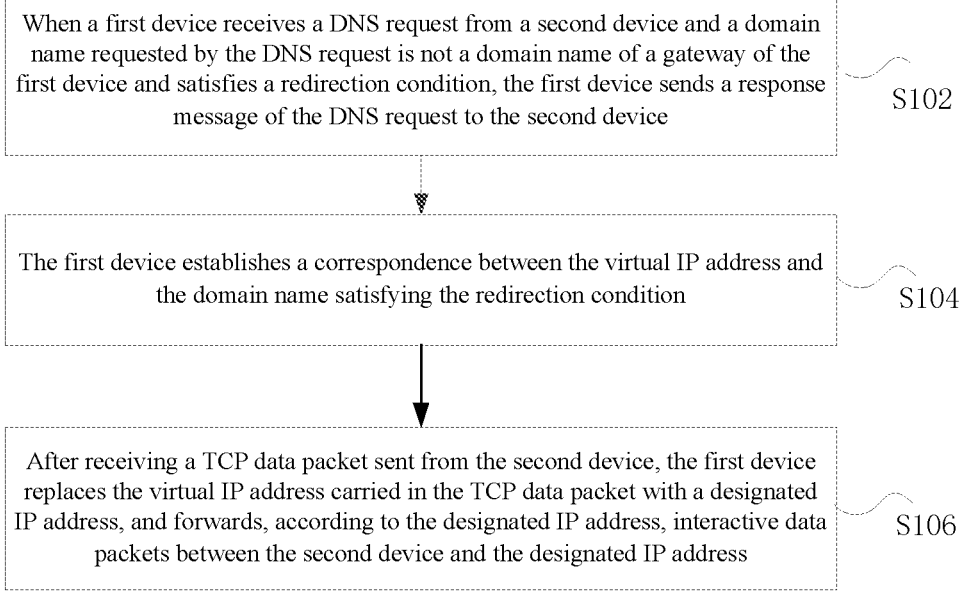
FIG. 1 is a flowchart of a method for redirection to a Web page according to an embodiment of the present disclosure.

The present embodiment provides a method for redirection to a Web page. FIG. 1 is a flowchart of a method for redirection to a Web page according to an embodiment of the present disclosure. As shown in FIG. 1, the method includes the steps S102 to S106.

At Step S102: When a first device receives a DNS request from a second device and a domain name requested by the DNS request is not a domain name of a gateway of the first device and satisfies a redirection condition, the first device sends a response message of the DNS request to the second device.

The response message carries an unused virtual IP address in a locally preset virtual IP address group; the unused virtual IP address refers to a virtual IP address having not been used for redirecting a DNS response packet yet.

At Step S104: The first device establishes a correspondence between the virtual IP address and the domain name satisfying the redirection condition.

At Step S106: After receiving a TCP data packet sent from the second device, the first device replaces the virtual IP address carried in the TCP data packet with a designated IP address, and forwards, according to the designated IP address, interactive data packets between the second device and the designated IP address.

By means of the above embodiments, the DNS response packet fed back to the second device by the first device carries the virtual IP address, and when the first device receives the TCP data packet of the second device, the virtual IP address in the TCP data packet is replaced, thus implementing data interaction between the second device and the first device. The problem in the related art where a redirected domain name will be redirected within a period of time in case of not wiping a cache from a PC browser when being not required to be redirected due to optimization of the PC browser is solved, thus the user experience is improved.

There are many modes for replacing a virtual IP address involved in the present embodiment. In an implementation mode of the present embodiment, the virtual IP address is replaced by using the following modes.

When the redirection condition is satisfied, the designated IP address is replaced with a gateway address of the first device, and interactive data packets between the second device and the gateway are forwarded according to the gateway address.

When the redirection condition is not satisfied, the first device acquires a destination address of the TCP data packet from the TCP data packet, and the first device judges whether a virtual IP address corresponding to the destination address exists in the virtual IP address group. If so, a redirected domain name corresponding to the virtual IP address is searched; and the virtual IP address is replaced with a true IP address of the redirected domain name, and interactive data packets between the second device and the true IP address are forwarded according to the true IP address of the redirected domain name.

In another implementation mode of the present embodiment, the mode of acquiring the true IP address may be implemented by the following mode: conducting DNS resolution on the redirected domain name, so as to obtain a true IP address of the redirected domain name.

In order to improve the experience effect of the user, after the true IP address of the redirected domain name is acquired, a correspondence between the redirected domain name and the true IP address of the redirected domain name is saved.

Figure 2:
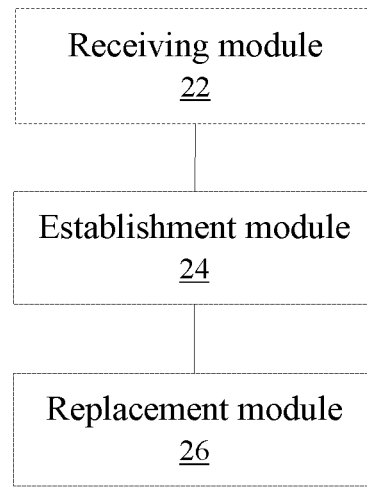
FIG. 2 is a structural diagram of a device for redirection to a Web page according to an embodiment of the present disclosure.

The embodiments of the present disclosure also provide a device for redirection to a Web page. The device may be configured to implement the abovementioned method embodiment of the present disclosure. FIG. 2 is a structural diagram of a device for redirection to a Web page according to an embodiment of the present disclosure. As shown in FIG. 2, the device includes:

a receiving module 22, configured to send, when a DNS request is received from a second device and a domain name requested by the DNS request is not a domain name of a gateway of the first device and satisfies a redirection condition, a response message of the DNS request to the second device, the response message carrying an unused virtual IP address in a locally preset virtual IP address group, the unused virtual IP address being a virtual IP address having not been used for redirecting a DNS response packet yet;

an establishment module 24, coupled to the receiving module 22, and configured to establish a correspondence between the virtual IP address and the domain name satisfying the redirection condition; and a replacement module 26, coupled to the establishment module 24, and configured to replace, after receiving a TCP data packet sent from the second device, the virtual IP address carried in the TCP data packet with a designated IP address, and forward, according to the designated IP address, interactive data packets between the second device and the designated IP address.

Figure 3:
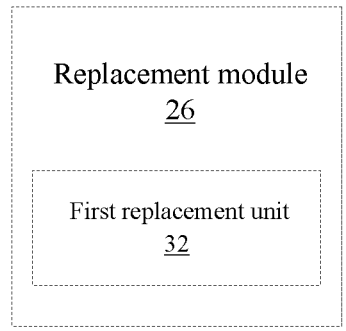
FIG. 3 is a structural diagram 1 of a device for redirection to a Web page according to an embodiment of the present disclosure.

FIG. 3 is a structural diagram 1 of a device for redirection to a Web page according to an embodiment of the present disclosure. As shown in FIG. 3, the replacement module 26 further includes: a first replacement unit 32, configured to replace, when the redirection condition is satisfied, the designated IP address with a gateway address of the first device, and forward interactive data packets between the second device and the gateway according to the gateway address.

Figure 4:
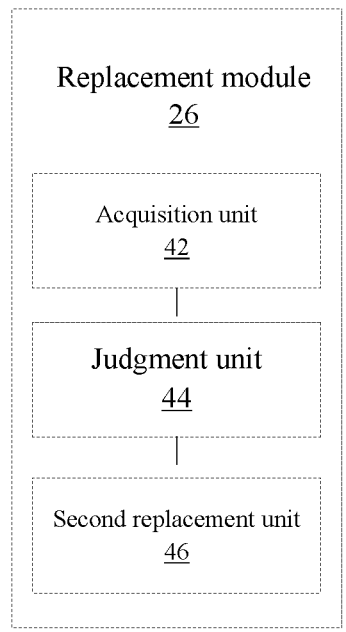
FIG. 4 is a structural diagram 2 of a device for redirection to a Web page according to an embodiment of the present disclosure.

FIG. 4 is a structural diagram 2 of a device for redirection to a Web page according to an embodiment of the present disclosure. As shown in FIG. 4, the replacement module 26 further includes: an acquisition unit 42, configured to acquire a destination address of the TCP data packet from the TCP data packet;

a judgment unit 44, coupled to the acquisition unit 42, and configured to judge whether a virtual IP address corresponding to the destination address exists in the virtual IP address group; and a second replacement unit 46, coupled to the judgment unit 44, and configured to search, if so, for a redirected domain name corresponding to the virtual IP address, replace the virtual IP address with a true IP address of the redirected domain name, and forward interactive data packets between the second device and the true IP address according to the true IP address of the redirected domain name.

Figure 5:
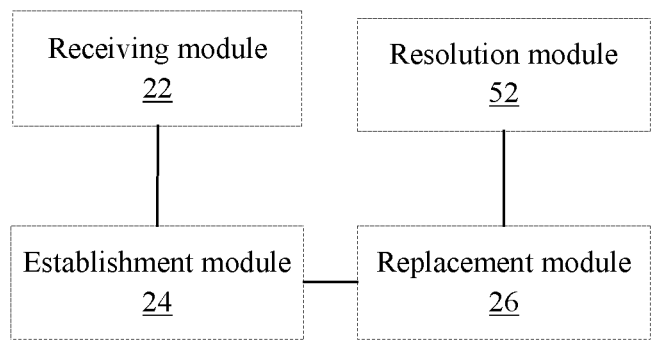
FIG. 5 is a structural diagram 3 of a device for redirection to a Web page according to an embodiment of the present disclosure.

FIG. 5 is a structural diagram 3 of a device for redirection to a Web page according to an embodiment of the present disclosure. As shown in FIG. 5, the device further includes: a resolution module 52, coupled to the replacement unit 26, and configured to conduct DNS resolution on the redirected domain name, so as to obtain a true IP address of the redirected domain name.

Figure 6:
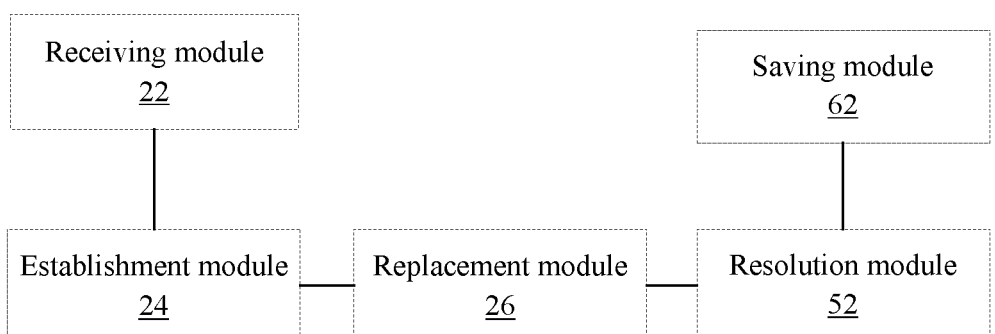
FIG. 6 is a structural diagram 4 of a device for redirection to a Web page according to an embodiment of the present disclosure.

FIG. 6 is a structural diagram 4 of a device for redirection to a Web page according to an embodiment of the present disclosure. As shown in FIG. 6, the device further includes: a saving module 62, coupled to the resolution module 52, and configured to save a correspondence between the redirected domain name and the true IP address of the redirected domain name.

It is important to note that the device for redirection to a Web page described in the device embodiment corresponds to the abovementioned method embodiment. A specific implementation process has been illustrated in detail in the method embodiment, which will not be elaborated herein.

The present disclosure will be illustrated with examples hereinbelow in conjunction with alternative embodiments of the present disclosure and the drawings.

In order to solve the problem in the related art where a redirected domain name will be redirected within a period of time in case of not wiping a cache from a PC browser when being not required to be redirected due to optimization of the PC browser so as to improve the user experience, in an embodiments of the present disclosure, the following steps S1 to S3 are provided to solve the abovementioned problem is solve.

At Step S1: When a device receives a DNS request sent from a PC and a requested domain name is not a domain name of a gateway of the device and satisfies a redirection condition, an unused virtual IP address in a preset virtual IP address group is selected, and a DNS response data packet is assembled and returned to the PC.

At Step S2: A correspondence between the redirected domain name and a responding virtual IP address is recorded and saved.

At Step S3: When the device receives a tcp data packet sent from the PC, and if the redirection condition is satisfied, a virtual IP address in the tcp data packet with a gateway address and interactive data packets between the PC and the gateway are forwarded.

If the redirection condition is satisfied and a destination address of the tcp data packet is in a preset virtual IP address group, a domain name of a true access address of the tcp data packet is found according to the correspondence between the redirected domain name and the virtual IP address, a true IP address of the domain name is acquired, a virtual target IP address in the data packet is replaced with the true IP address, and interactive data packets between the PC and the true IP address are forwarded.

The defect in the related art of user experience resulting from optimization of the PC browser is overcome by means of the abovementioned mode, thus improving the user experience.

The method for redirecting a mobile terminal to a Web page of a gateway according to an embodiment of the present disclosure includes step A to step K.

At Step A: When a user accesses a web page of a PC browser via a domain name and a device receives a DNS request, it is judged whether to request for a domain name of a gateway before entering a DNS resolution flow. If so, the flow is ended, and a normal DNS resolution flow is entered. If not, Step B is executed.

At Step B: It is judged whether a redirection condition is satisfied. If not, the flow is ended, and a normal DNS resolution flow is entered. If not, Step C is executed.

At Step C: An unused virtual IP address is selected from a set virtual IP address group, and a DNS response packet is assembled and returned to a PC browser.

At Step D: A correspondence between a domain name of the DNS request and a responding virtual IP address is recorded.

At Step E: When receiving a tcp handshaking message sent from the PC browser, the device judges whether the redirection condition is satisfied, if so, Step F is executed, and if not, Step H is jumped.

At Step F: A tcp data packet sent from the PC browser is forwarded to the gateway, and a tcp response message of the gateway is forwarded to the PC browser.

At Step G: After receiving an http request sent from the PC browser, the device assembles an http 302 redirection message for redirection to the domain name of the gateway, and the flow is ended.

At Step H: It is judged whether a target address of the tcp data packet is in a set virtual IP address group. If not, a normal data routing flow is executed, and then the flow is ended. If so, Step I is executed.

At Step I: A domain name corresponding to the target address of the tcp data packet is found from the recorded correspondence of the redirected domain name with the virtual IP address.

At Step J: The recorded domain name and the recorded true IP address are searched for a true IP address of the domain name. If not, DNS resolution is conducted on the domain name to obtain the true IP address of the domain name, and a correspondence record is saved.

At Step K: A message of the PC browser is forwarded to the true IP address, and a data packet response of the true IP address is forwarded to the PC browser.

If the user accesses by directly using an IP address or the PC browser accesses by using a cached IP address, the flow directly starts from Step E.

Compared with the related art, the method in the embodiment of the present disclosure can overcome the problem and defect in the related art of redirection to a Web page of a gateway due to optimization of a PC browser, thus improving the user experience.

Figure 7:
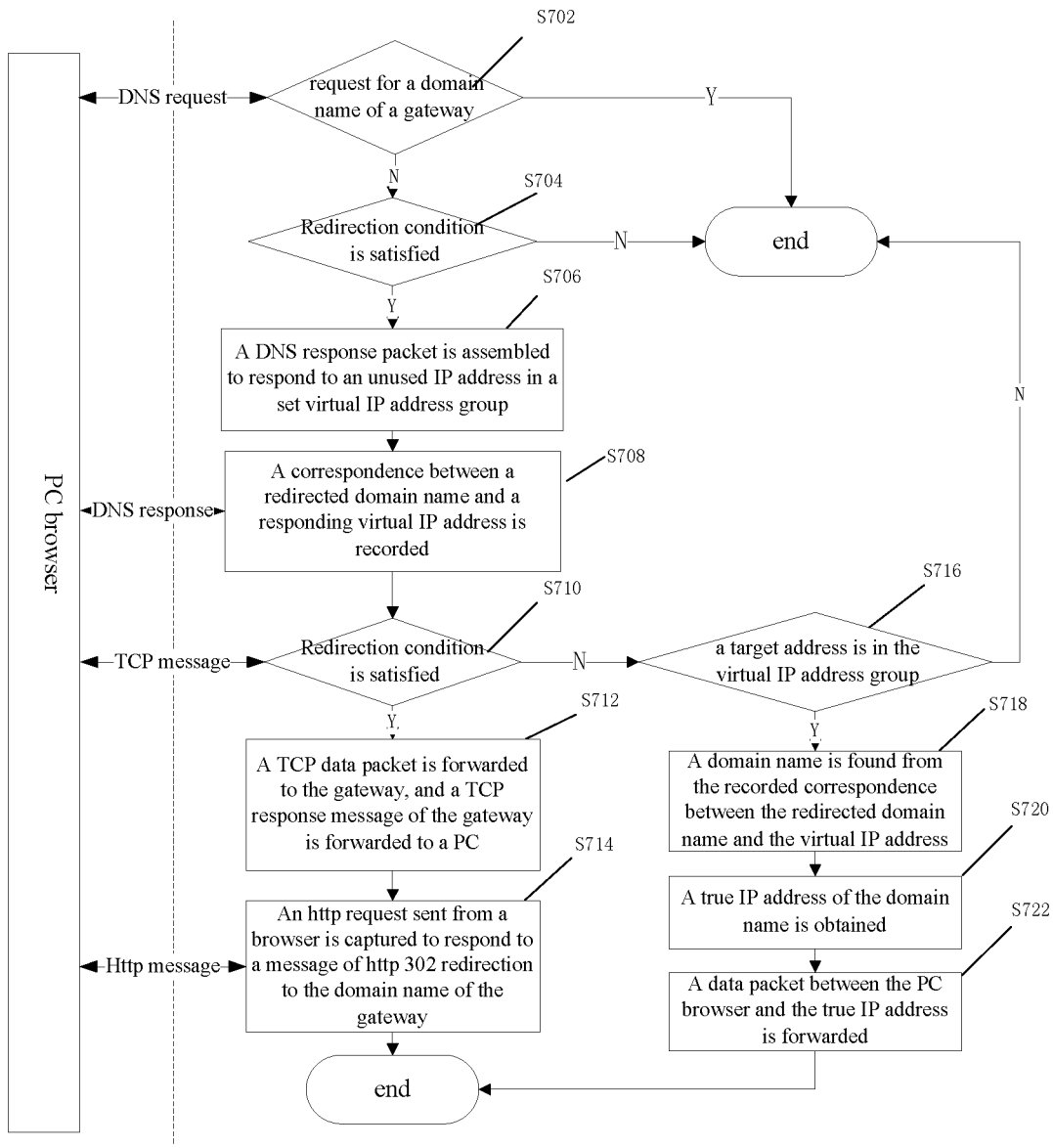
FIG. 7 is a flowchart of a solution for redirecting a mobile terminal to a Web page of a gateway according to an embodiment of the present disclosure.

The implementation of the technical solution will be further described in detail hereinbelow in conjunction with FIG. 7. FIG. 7 is a flowchart of a solution for redirecting a mobile terminal to a Web page of a gateway according to an embodiment of the present disclosure. The flow includes the steps S702 to S722.

At Step S702: When a user accesses a web page of a PC browser via a domain name and a device receives a DNS request, it is judged whether to request for a domain name of a gateway before entering a DNS resolution flow.

If the DNS request is for the domain name of the gateway, processing is not needed, and a normal DNS resolution flow is entered to respond to a DNS response of a gateway address. If not, the next step is entered.

At Step S704: It is judged whether a redirection condition is satisfied.

If the redirection condition is not satisfied, processing is not needed, a normal DNS resolution flow is entered, and a true IP address corresponding to the domain name is resolved from a network. If the redirection condition is satisfied, the next step is entered.

At Step S706: An unused virtual IP address is selected from a set virtual IP address group, and a DNS response packet is assembled and returned to a PC browser.

At Step S708: A correspondence between a domain name of the DNS request and a responding virtual IP address is recorded.

The recorded correspondence between the redirected domain name and the responding virtual IP address is recorded for use in the subsequent steps.

At Step S710: When receiving a tcp handshaking message sent from the PC browser, the device judges whether the redirection condition is satisfied.

If so, it skips to Step S612, and if not, it skips to Step S616.

At Step S712: A tcp data packet sent from the PC browser is forwarded to the gateway, and a tcp response message of the gateway is forwarded to the PC browser.

A device tcp protocol stack forwards tcp data interaction between the PC browser and the gateway of the device.

At Step S714: After receiving an http request sent from the PC browser, the device assembles an http 302 redirection message for redirection to the domain name of the gateway, and the flow is ended.

When the PC browser completes tcp handshaking, an http request message will be sent, and at this time, an effect of redirection to a Web page of the gateway is achieved by responding to an http 302 message.

At Step S716: It is judged whether a target address of the tcp data packet is in a set virtual IP address group.

When the browser sends a tcp handshaking request and the redirection condition is not satisfied, it is judged whether the target address of the data packet is in the set virtual IP address group. If not, a normal data routing flow is executed, and then the flow is ended. If so, it skips to Step S718.

At Step S718: A domain name corresponding to the target address of the tcp data packet is found from the recorded correspondence between the redirected domain name and the virtual IP address.

A domain name corresponding to a tcp target virtual address is found from an information record recorded in Step S708.

At Step S720: A true IP address of the domain name is obtained.

The domain name recorded in Step S720 and a true IP address record are searched for the true IP address of the domain name. If it cannot be found in the record, DNS resolution is conducted on the domain name, the true IP address of the domain name is obtained from a network, and a record about a correspondence between the domain name and the true IP address is saved.

At Step S722: A data packet interactive between the PC browser and the true IP address is forwarded.

The above is only the exemplary embodiments of the present disclosure, and not intended to limit the present disclosure. There may be various modifications and variations in the present disclosure for those skilled in the art. Any modifications, equivalent replacements, improvements and the like shall fall within the scope of protection of the present disclosure.

INDUSTRIAL APPLICABILITY

As above, the method and device for redirection to a Web page provided in the embodiments of the present disclosure have the following beneficial effects: the problem in the related art where a redirected domain name will be redirected within a period of time in case of not wiping a cache from a PC browser when being not required to be redirected due to optimization of the PC browser is solved, thus the user experience is improved.

What is claimed is:

1. A method for redirection to a Web page, comprising:
    when a first device receives a Domain Name System (DNS) request from a second device and a domain name requested by the DNS request is not a domain name of a gateway of the first device and satisfies a redirection condition, sending, by the first device, a response message of the DNS request to the second device, wherein an unused virtual Internet Protocol (IP) address in a locally preset virtual IP address group is carried in the response message, and the unused virtual IP address being a virtual IP address having not been used for redirecting a DNS response packet yet;
    establishing, by the first device, a correspondence between the virtual IP address and the domain name satisfying the redirection condition; and
    after the first device receives a Transport Control Protocol (TCP) data packet sent from the second device, replacing the virtual IP address carried in the TCP data packet with a designated IP address, and forwarding, according to the designated IP address, interactive data packets between the second device and the designated IP address.

2. The method as claimed in claim 1, wherein replacing, when the redirection condition is satisfied, the virtual IP address carried in the TCP data packet according to the designated IP address to further implement the interactive data packets of data via the designated IP address comprises:
    replacing the designated IP address with a gateway address of the first device, and forwarding interactive data packets between the second device and the gateway according to the gateway address.

3. The method as claimed in claim 1, wherein replacing, when the redirection condition is not satisfied, the virtual IP address carried in the TCP data packet according to the designated IP address to further implement the interactive data packets of data via the designated IP address comprises:
    acquiring, by the first device, a destination address of the TCP data packet from the TCP data packet;
    judging, by the first device, whether a virtual IP address corresponding to the destination address exists in the virtual IP address group; and
    when the virtual IP address corresponding to the destination address exists in the virtual IP address group, searching for a redirected domain name corresponding to the virtual IP address, replacing the virtual IP address with a true IP address of the redirected domain name, and forwarding interactive data packets between the second device and the true IP address according to the true IP address of the redirected domain name.

4. The method as claimed in claim 3, wherein after forwarding the interactive data packets between the second device and the true IP address according to the true IP address of the redirected domain name, the method further comprises:
    conducting DNS resolution on the redirected domain name to obtain a true IP address of the redirected domain name.

5. The method as claimed in claim 4, wherein after forwarding the interactive data packets between the second device and the true IP address according to the true IP address of the redirected domain name, the method further comprises:
    saving a correspondence between the redirected domain name and the true IP address of the redirected domain name.

6. A device for redirection to a Web page, wherein the device is set in a first device, the device comprises a hardware processor configured to execute program modules stored on a memory, and the program modules comprise:
    a receiving module, configured to send, when a Domain Name System (DNS) request is received from a second device and a domain name requested by the DNS request is not a domain name of a gateway of the first device and satisfies a redirection condition, a response message of the DNS request to the second device, wherein an unused virtual Internet Protocol (IP) address in a locally preset virtual IP address group is carried in the response message, the unused virtual IP address being a virtual IP address having not been used for redirecting a DNS response packet yet;
    an establishment module, configured to establish a correspondence between the virtual IP address and the domain name satisfying the redirection condition; and
    a replacement module, configured to replace, after receiving a Transport Control Protocol (TCP) data packet sent from the second device, the virtual IP address carried in the TCP data packet with a designated IP address, and forward, according to the designated IP address, interactive data packets between the second device and the designated IP address.

7. The device as claimed in claim 6, wherein the replacement module comprises:
   a first replacement unit, configured to replace, when the redirection condition is satisfied, the designated IP address with a gateway address of the first device, and forward interactive data packets between the second device and the gateway according to the gateway address.

8. The device as claimed in claim 6, wherein when the redirection condition is not satisfied, the replacement module further comprises:
   an acquisition unit, configured to acquire a destination address of the TCP data packet from the TCP data packet;
   a judgment unit, configured to judge whether a virtual IP address corresponding to the destination address exists in the virtual IP address group; and
   a second replacement unit, configured to search, when the virtual IP address corresponding to the destination address exists in the virtual IP address group, for a redirected domain name corresponding to the virtual IP address, replace the virtual IP address with a true IP address of the redirected domain name, and forward interactive data packets between the second device and the true IP address according to the true IP address of the redirected domain name.

9. The device as claimed in claim 8, further comprising:
   a resolution module, configured to conduct DNS resolution on the redirected domain name to obtain a true IP address of the redirected domain name.

10. The device as claimed in claim 9, further comprising:
    a saving module, configured to save a correspondence between the redirected domain name and the true IP address of the redirected domain name.

* * * * *